C. A. HENRY.
RAIL FASTENING.
APPLICATION FILED APR. 28, 1920.

1,348,112.

Patented July 27, 1920.
4 SHEETS—SHEET 1.

Inventor
Charles Albert Henry

C. A. HENRY.
RAIL FASTENING.
APPLICATION FILED APR. 28, 1920.
1,348,112.
Patented July 27, 1920.
4 SHEETS—SHEET 2.
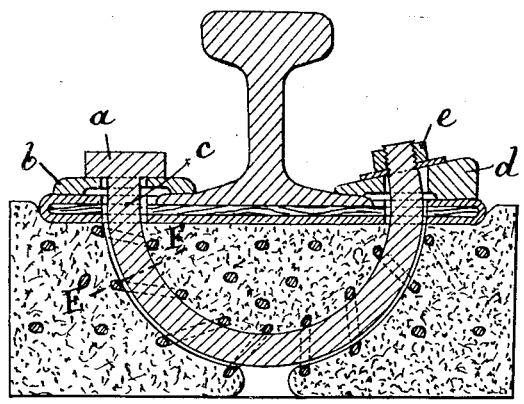
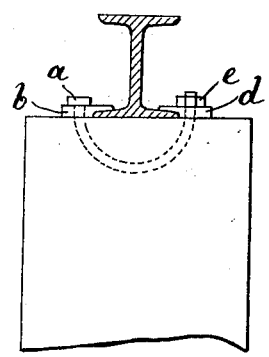
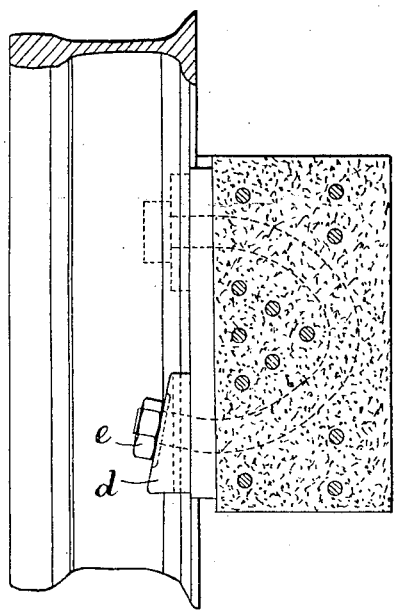
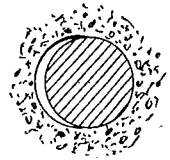
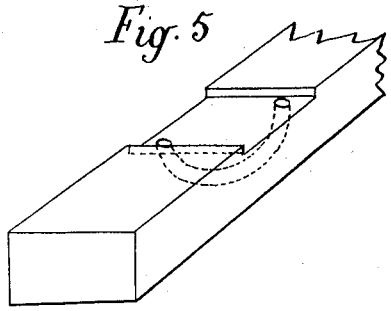

C. A. HENRY.
RAIL FASTENING.
APPLICATION FILED APR. 28, 1920.

1,348,112.

Patented July 27, 1920.
4 SHEETS—SHEET 3.

Inventor
Charles Albert Henry,
By [signature] Atty.

C. A. HENRY.
RAIL FASTENING.
APPLICATION FILED APR. 28, 1920.

1,348,112.

Patented July 27, 1920.
4 SHEETS—SHEET 4.

Inventor
Charles Albert Henry
By
Atty.

UNITED STATES PATENT OFFICE.

CHARLES ALBERT HENRY, OF PARIS, FRANCE.

RAIL-FASTENING.

1,348,112.  Specification of Letters Patent.  Patented July 27, 1920.

Application filed April 28, 1920. Serial No. 377,268.

*To all whom it may concern:*

Be it known that I, CHARLES ALBERT HENRY, citizen of the Republic of France, residing at Paris, Seine, France, have invented certain new and useful Improvements in Rail-Fastenings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to bolts for fixing metallic constructional elements on to reinforced concrete structures and particularly for fixing railway rails on to reinforced concrete sleepers, or machinery frames on their foundations, or sections of any description on to walls, columns, and the like.

This invention has for its object a bolt enabling metallic members to be secured easily and very firmly to reinforced concrete.

For several years it has been sought to apply reinforced concrete to the construction of railway sleepers, but the great difficulty met hitherto has been to find a system of fastening which is simple, solid and springy.

This purpose is realized by the present invention according to which a system of fastening consists of a single bolt the curved stem of which forms almost a half circle, and which is located in a tubular recess of semi-circular shape, provided in the sleeper while the latter is being molded. This tubular recess allows the stem of the bolt to come out on the upper face of the sleeper by two openings diagonally situated in respect of the bearing surface of the rail flange on the upper face of the sleeper.

The tightening of the nut communicates the strain through the bolt to clamps which grip the edges of the rail and maintain said rail in position. The bolt may be replaced by a rod threaded at both ends with a nut at each end.

Referring to the accompanying drawings:

Figures 1 to 6 show as an example the details of the invention applied to a sleeper provided with a steel bearing piece with wooden packing between the rail and the sleepers.

Fig. 1 is a side elevation of a sleeper near the end with the fastening.

Fig. 2 is a plan of the sleeper with the fastening.

Fig. 3 is a section of the fastening bolt along the line A—B of Fig. 2.

Fig. 4 is a sectional view from one side of the sleeper with the fastening, along the line C—D of Fig. 2.

Fig. 5 is a perspective view of one end of a sleeper prepared to receive the bearing piece and the parts of the attaching device.

Fig. 6 is a magnified section along the line E—F of Fig. 3.

Fig. 7 shows the application of the curved bolt for securing an I-beam to a reinforced concrete wall.

The bolt is sufficiently strong to resist shocks, it is springy, because it works along all its length, since it is not embedded in the concrete. Its sliding can be facilitated in interposing a sheet of lead or of plastic or greasy material between the bolt and the concrete, on the side on which it bears when tightening takes place.

Referring first to the form of Figs. 1 to 6; the head $a$ of the bolt rests on the clamp $b$. The portion $c$ of the bolt is straight so that the head $a$ should rest squarely on the face of the clamp $b$.

The clamp $d$ has the upper face machined perpendicularly to the axis of the bolt at its end, so that the nut $e$ should be able to efficiently tighten the bolt in the direction of its axis.

To provide the recess for the bolt during the molding of the sleeper, a mandrel in the shape of a half ring of ovoidal section is used, the small end of the mandrel having a diameter slightly greater than that of the bolt (see Fig. 6). The mandrel is slightly conical to permit its withdrawal after molding.

A wire may be coiled around the mandrel so as to form an irregular spiral, which remains embedded in the concrete and protects it against the effect of the pressure of the bolt.

It is seen from the above description that the invention consists in a system of fastening of metallic structural elements such as rails on reinforced concrete, by a single bolt, cheap, solid, free in a recess provided in a reinforced concrete sleeper during the manufacture of said sleeper.

The free bolt being springy, its stem presses against the concrete along its whole length, and one half of its surface, and embracing the central bearing portions of the concrete which, being gripped between the rail and the concrete, are stressed uniformly and transmit the stresses as a whole to the sleeper block. It will be understood how easily this bolt can be put in position and taken out in already laid tracks, allowing even the rails to be changed without disturbing the sleepers, therefore, for all the above reasons, realizing a considerable economy in the application of the reinforced concrete sleepers to railway tracks. This fastening can be applied to numerous types of concrete sleepers or to the concrete stringers supporting the rails along their whole length, a system frequently used for tramway tracks and for tracks laid upon understructures in reinforced concrete, such as work piers and harbor quays.

Fig. 7 shows the application of the curved bolt to secure an I-beam upon a reinforced concrete wall, or pole or the like, but the invention can be applied in every case where it is necessary to secure any metallic piece upon reinforced concrete masonry.

Figure 1:
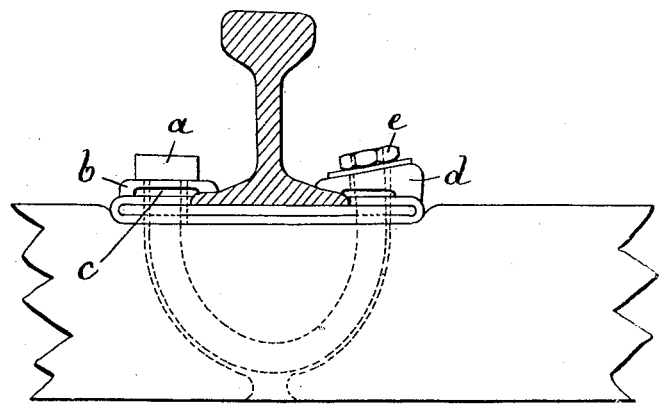
Figure 2:
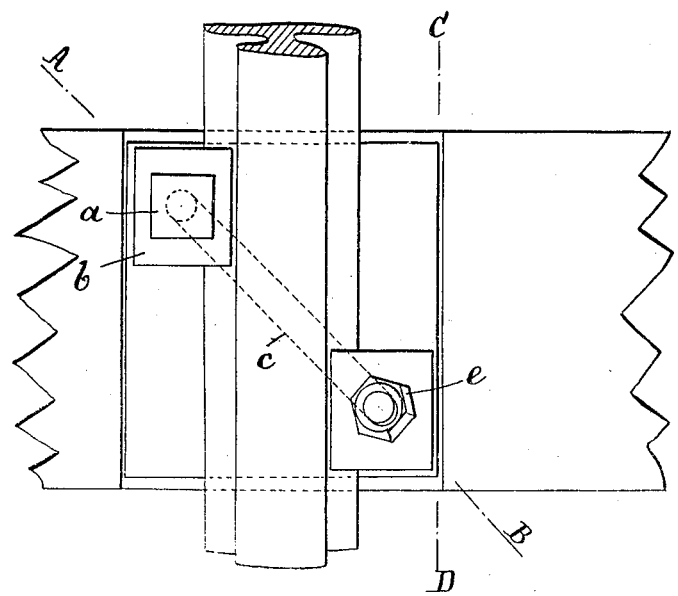
Figure 8:
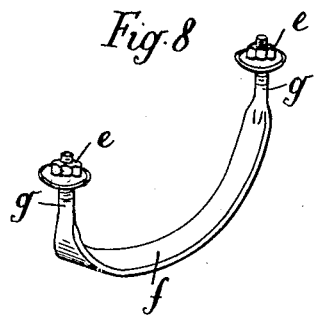
Fig. 8 is a perspective view of a modified form of the curved bolt.
Figure 12:
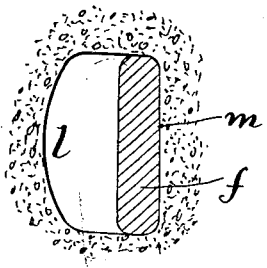
Fig. 12 shows, also on a larger scale, a section on line G—H of Fig. 10.
Figure 13:
Figs. 13 to 16 represent a set of clamps allowing the distance between the rails to be varied along the curves between certain limits.
Figure 14:
Figure 15:
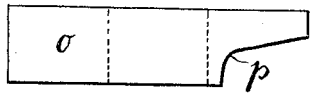
Figure 16:
Figure 9:
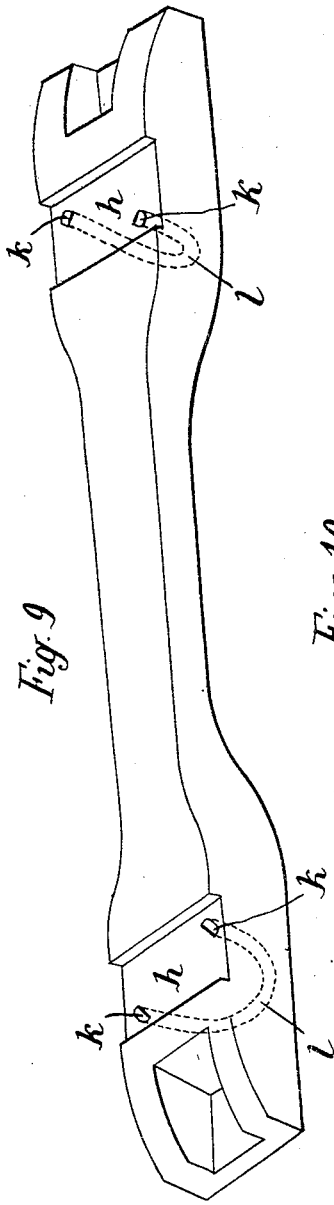
Fig. 9 is a perspective view of a reinforced concrete sleeper prepared to receive curved bolts.
Figure 10:
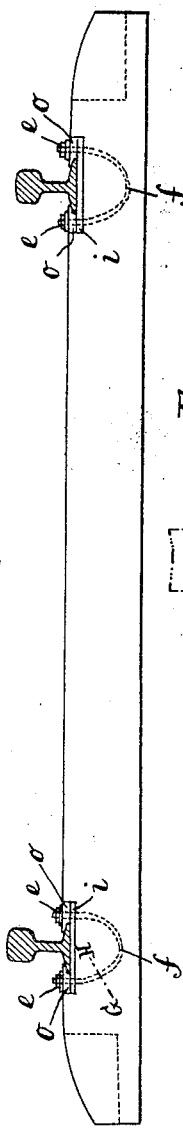
Fig. 10 is a transverse section of a railway track constructed on reinforced concrete sleepers.

Referring now to the form of Figs. 8 to 16:

The bolt, shown separate in Fig. 8, includes a semi-circular flattened portion $f$, terminated at the two ends with parallel straight cylindrical stems $g$ which are threaded to receive tightening nuts $e$. Two grooves $h$ $h$ (Fig. 9) are provided in the concrete sleeper similar to the grooves for the chairs or wooden sleepers, and in which a wooden or felt sole $i$ is placed, upon which rests the flange of the rail; in these grooves $h$ $h$ are the openings $k$ $k$ of the tubular semi-circular recesses $l$ comprising a flat portion $m$, in which the bolts pass, and the section of which, shown in Fig. 12, is such that the said bolts can slide therein.

When the nuts $e$ are tightened on the clamps securing the rail, the flat part $f$ of the bolt tightens the part $m$, also flat, of the tubular semi-circular recess $l$ of the sleeper, and acting as a hoop, the tightening is thereby produced by a plane surface distributing the pressure caused by the tightening of the nuts.

The clamps $o$ upon which the tightening nuts $e$ of the bolts act, grip the edge of the rail and react against the wooden or felt sole $i$, and are maintained in their position, which determines the distance between the rails, by the tightening of the bolt, on one hand, and on the other hand by the support on the concrete against the wall of the groove $h$.

The clamps $o$ are cut from a plate of steel, and the notch $p$, made with a planer, has the shape of the edge of the rail flange, but this notch can be more or less deep (Figs. 13 to 16) to allow the edge of the said flange to be engaged more or less under the clamp, in approaching the bolt by a greater or lesser extent.

It is easily seen that, according to the depth of the notch, the rail may be more or less distant from the axis of the track, which allows the rails to be placed at a greater distance apart than they are normally, this being required on curves of small radius, specially with reinforced concrete sleepers which are not springy and which would break under the lateral pressure of the car wheels.

Figure 11:
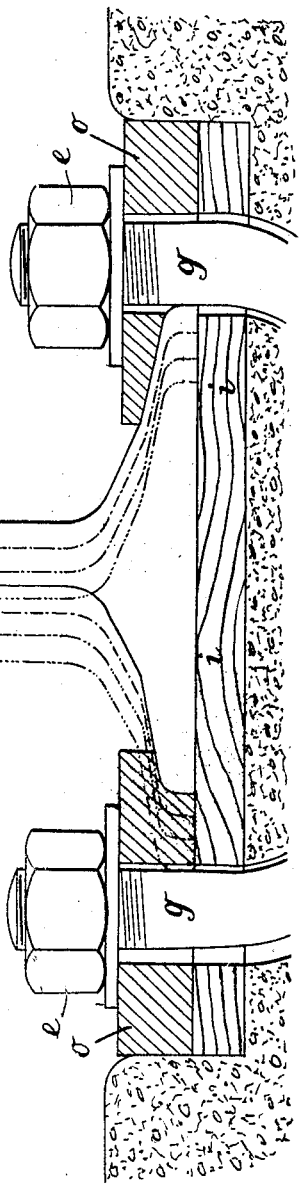
Fig. 11 shows on a larger scale the manner of fixing the rails by means of clamps.

Figs. 13 to 16 show four models of clamps which, by their combination on the two sides of the track can give an extra separation of the rails up to 30 millimeters, as seen by the outlines shown in interrupted lines on Fig. 11 which shows one side of the track.

The advantage of this system is that the same sleeper and the same bolt, with different clamps, allow the use of several types of rails the profiles of which are somewhat similar.

Claims:

1. A fastening device for fixing metallic members on to reinforced concrete, comprising: a bolt with a curved stem approximately semi-circular in shape, a part of reinforced concrete, a semi-circular tubular channel provided in the concrete during molding, two clamps adapted to grip the metallic member, each clamp having a perforation for the stem of said bolt, and means for tightening said member on to said concrete.

2. A fastening device for fixing metallic members on to reinforced concrete, comprising: a bolt with a curved stem approximately semi-circular in shape, straight and threaded end portions terminating the stem of the bolt, a part of reinforced concrete, a semi-circular tubular channel provided in the concrete during molding, two clamps adapted to grip the metallic member, each clamp having a perforation for the stem of said bolt, and tightening nuts adapted to fit on said threaded end portions of said stem.

3. A fastening device for fixing metallic members on to reinforced concrete, comprising: a bolt with a curved stem approximately semi-circular in shape, a part of reinforced concrete, a semi-circular tubular channel provided in the concrete during molding, the apertures of which are diagonally situated with respect to the axis of the metallic member, two clamps adapted to grip said member, each clamp having a perforation for the stem of said bolt, and means for tightening said member on to said concrete.

4. A fastening device for fixing a railway rail on to a reinforced concrete sleeper, comprising: a bolt approximately semi-circular in shape, a stem of flattened section on said bolt, straight and threaded end portions terminating the two ends of said stem, a sleeper of reinforced concrete, a flat groove in said sleeper, an approximately semi-circular tubular channel provided in the concrete while molding and opening in said flat groove, a flat surface on said channel to receive the flattened portion of the bolt, a pair of perforated clamps for each bolt, parallel straight cylindrical threaded end portions to said bolt adapted to project through said perforations, and tightening nuts adapted to fit on said threaded end portions.

5. A fastening device for fixing a railway rail on to a reinforced concrete sleeper, comprising: a bolt with a curved stem approximately semi-circular in shape, straight and threaded ends terminating said stem, a sleeper of reinforced concrete, a flat groove in said sleeper, an approximately semi-circular channel provided in the concrete during molding, a perforated notched clamp located in the groove for one end of said bolt, a second perforated clamp with a notch of different depth for the other end of said bolt, and tightening nuts adapted to fit on said threaded ends of the bolt.

In testimony that I claim the foregoing as my invention I have signed my name.

CHARLES ALBERT HENRY.